United States Patent Office 2,912,451
Patented Nov. 10, 1959

2,912,451

HIGHER ACYCLIC TETRAMETHYLPHOSPHORO-DIAMIDATES

Kenneth L. Godfrey, St. Albans, W. Va., assignor to Monsanto Chemical Company, St. Louis, Mo., a corporation of Delaware No Drawing. Application March 13, 1957
Serial No. 645,663

9 Claims. (Cl. 260—461)

This invention relates to higher acyclic esters of tetramethylphosphorodiamidic acid and to methods for their preparation.

Higher acyclic esters of phosphorodiamidic acid may be prepared by amidation of the corresponding higher acyclic chloridates available from condensation of higher alcohols and phosphoryl chloride. Condensation with the alcohol first is preferable in order to take advantage of the most reactive chlorine for condensation with the alcohol. Although the presence of the higher acyclic radical reduces reactivity, the phosphoroamidates form in reasonably good yields by condensing the chloridates with dimethylamine. Condensation with higher amines is much more difficult. Moreover, it has been found that higher acyclic tetramethylphosphorodiamidates possess unusual, unexpected properties particularly as contact weed killers.

Typical examples of the new compounds comprise 3-octenyl tetramethylphosphorodiamidate
4-octenyl tetramethylphosphorodiamidate
6-hexenyl tetramethylphosphorodiamidate
2-hexenyl tetramethylphosphorodiamidate
Hexyl tetramethylphosphorodiamidate
Heptyl tetramethylphosphorodiamidate
Octyl tetramethylphosphorodiamidate
2-ethylhexyl tetramethylphosphorodiamidate
Nonyl tetramethylphosphorodiamidate
Decyl tetramethylphosphorodiamidate
Undecyl tetramethylphosphorodiamidate
Dodecyl tetramethylphosphorodiamidate The following are illustrative of methods by which the new compounds may be prepared:

EXAMPLE 1

To a solution of 300 parts by weight (1.22 moles) of 2-ethylhexyl phosphorodichloridate dissolved in 1090 parts of trichlorethylene was added 248 parts (5.5 moles) of dimethylamine at the rate of 2 parts per minute, and at a temperature of 60° C. After the addition was complete the mixture was stirred for 30 minutes at 60° C., cooled and filtered. The salt cake was washed with more trichlorethylene and the combined filtrates then removed of solvent by heating to a pot temperature of 95° C./30 mm. The residue was distilled through a 4' Vigreux column and 246 parts of the desired 2-ethylhexyl tetramethylphosphorodiamidate was obtained which distilled at 143–145° C./6–7 mm. (76.6% yield). Analysis gave 11.6% phosphorus and 10.7% nitrogen as compared to values of 11.8% phosphorus and 10.7% nitrogen calculated for $C_{12}H_{29}N_2O_2P$.

EXAMPLE 2

Following the procedure of Example 1, 140 parts by weight (3.1 moles) of dimethylamine was added to a solution of 177 parts by weight (0.716 mole) of octyl phosphorodichloridate in 730 parts of trichlorethylene. The desired octyl tetramethylphosphorodiamidate (109 parts) distilled at 120° C./1 mm. and analyzed 12.1% phosphorus and 11.0% nitrogen as compared to 11.7% phosphorus and 10.6% nitrogen calculated for $C_{12}H_{29}N_2O_2P$

EXAMPLE 3

In the procedure of Example 1, 100 parts by weight (1.92 moles) of dimethylamine was added to a solution of 105.2 parts by weight (0.48 mole) of hexyl phosphorodichloridate in 582 parts of trichlorethylene. The hexyl tetramethylphosphorodiamidate (66.5 parts) obtained thereby was a colorless liquid boiling at 131–132° C./4.5 mm.

EXAMPLE 4

In the procedure of Example 1 the addition of 90 parts by weight (2.0 moles) of dimethylamine to a solution of 107.8 parts by weight (0.437 mole) of 6-methylheptyl phosphorodichloridate in 582 parts of trichlorethylene gave 6-methylheptyl tetramethylphosphorodiamidate (41.8 parts) boiling at 118–121° C./1.5 mm. It was a colorless liquid analyzing 10.8% nitrogen as compared to 10.7% calculated for $C_{12}H_{29}N_2O_2P$.

EXAMPLE 5

To a solution of 135.4 parts by weight (0.5 mole) of decyl phosphorodichloridate in 510 parts of trichlorethylene was added 100 parts by weight (2.2 moles) of dimethylamine. In the procedure of Example 1, 47 parts of decyl tetramethylphosphorodiamidate was obtained as a colorless liquid boiling at 159–165° C./2 mm. Analysis gave 11.1% phosphorus and 9.5% nitrogen as compared to 11.0% phosphorus and 9.9% nitrogen calculated for $C_{14}H_{33}N_2O_2P$.

EXAMPLE 6

To a solution of 230 parts by weight (0.76 mole) of dodecyl phosphorodichloridate in 720 parts of trichlorethylene was added 144 parts by weight (3.2 moles) of dimethylamine at the rate of 2 parts per minute and at a temperature of 60° C. The mixture was then stirred for one hour while cooling to room temperature. The product was then filtered, the salt cake washed with trichlorethylene and the combined filtrates stripped by heating to a pot temperature of 100° C./20 mm. The residue was vacuum fractionated at 157–190° C./3.5 mm. to yield 146 parts of dodecyl tetramethylphosphorodiamidate analyzing 8.7% nitrogen as compared to 8.8% calculated for $C_{16}H_{37}N_2O_2P$.

As illustrative of the properties of the new compounds for controlling vegetation, sprays containing the indicated concentration of the active ingredient were applied to foliage. The sprays were applied to the foliage of grass and to the foliage of broadleaved plants, the latter being either bean plants or a mixture of broadleaved plants and the effect recorded. A rating of 0 indicates no phytotoxicity, 1 slight phytotoxicity, 2 moderate phytotoxicity, 3 severe phytotoxicity, and 4 that the plant was dead.

Table I

| Active Ingredient | Conc. | Phytotoxicity Rating | | |
|---|---|---|---|---|
| | | Grass | Bean | Broadleaf |
| 2-Ethylhexyl tetramethyl-phosphorodiamidate | 0.5 | 4 | 4 | 4 |
| n-Dodecyl tetramethyl-phosphorodiamidate | 0.5 | 3+ | 3+ | 4 |
| | 0.2 | 2 | 2+ | 3 |
| n-Octyl tetramethyl-phosphorodiamidate | 0.5 | 4 | 3 | 4 |
| | 0.2 | 1 | 2 | 3 |
| Isobutyl tetramethyl-phosphorodiamidate | 0.5 | 0 | 0 | 1 |
| Hexyl tetramethyl-phosphorodiamidate | 0.5 | 2 | [1]3 | 4 |
| | 0.2 | 1 | 1 | 2 |
| 6-Methylheptyl tetramethyl-phosphorodiamidate | 0.5 | 4 | [1]3 | 4 |
| | 0.2 | 2 | 3 | 4 |
| Decyl tetramethyl-phosphorodiamidate | 0.5 | 4 | -------- | 4 |
| | 0.2 | 2 | -------- | 2 |
| Ethyl tetramethyl-phosphorodiamidate | 0.5 | 0 | -------- | 0 |

[1] 76–100% defoliation.

It is apparent from the foregoing data that the higher acyclic esters are very effective phytotoxicants. Moreover, the new compounds have other uses. The higher acyclic esters possess emulsifying properties. They are also plasticizers for rubber and resins and are nematode poisons.

It is intended to cover all changes and modifications of the examples of the invention herein chosen for purposes of disclosure which do not constitute departures from the spirit and scope of the invention.

This application is a continuation-in-part of my application Serial No. 567,736, filed February 27, 1956.

What is claimed is:
1. A higher acyclic hydrocarbon ester of tetramethylphosphorodiamidic acid wherein the hydrogen atoms in the higher acyclic hydrocarbon radical total at least $2_{n-1}$ where $n$ represents the number of carbon atoms and is 6–12.
2. A higher alkenyl ester of tetramethylphosphorodiamidic acid wherein the alkenyl radical belongs to the series $C_nH_{2n-1}$ where $n$ is an integer from 6–12.
3. 2-ethylhexyl tetramethylphosphorodiamidate.
4. Dodecyl tetramethylphosphorodiamidate.
5. Hexyl tetramethylphosphorodiamidate.
6. Decyl tetramethylphosphorodiamidate.
7. The method which comprises condensing a higher acyclic hydrocarbon phosphorodichloridate wherein the hydrogen atoms in the higher acyclic hydrocarbon radical total at least $2_{n-1}$ where $n$ represents the number of carbon atoms and is 6–12 with dimethylamine and isolating a higher acyclic ester of tetramethylphosphorodiamidic acid.
8. The method which comprises condensing a higher alkyl phosphorodichloridate wherein the alkyl radical contains 6–12 carbon atoms with dimethylamine and isolating a higher alkyl ester of tetramethylphosphorodiamidic acid.
9. A higher alkyl ester of tetramethylphosphorodiamidic acid wherein the alkyl radical contains 6–12 carbon atoms.

References Cited in the file of this patent
UNITED STATES PATENTS
2,502,966　　Kosolapoff _____ Apr. 4, 1950
FOREIGN PATENTS
246,915　　Switzerland _____ Nov. 1, 1947
696,219　　Great Britain _____ Aug. 26, 1953